United States Patent [19]

Hochsattel

[11] Patent Number: 4,646,518

[45] Date of Patent: Mar. 3, 1987

[54] DRIVING UNIT FOR A FEED PUMP

[75] Inventor: Siegmar-J. Hochsattel, Lohr-Steinbach, Fed. Rep. of Germany

[73] Assignee: Mannesmann Rexroth GmbH, Fed. Rep. of Germany

[21] Appl. No.: 626,683

[22] Filed: Jul. 2, 1984

[30] Foreign Application Priority Data

Jul. 15, 1983 [DE] Fed. Rep. of Germany ....... 3325682

[51] Int. Cl.[4] ............................................ F16D 31/02

[52] U.S. Cl. ....................................... 60/413; 91/436; 91/454

[58] Field of Search ..................... 91/436, 454; 60/413

[56] References Cited

U.S. PATENT DOCUMENTS

| | | | |
|---|---|---|---|
| 3,376,792 | 4/1968 | Clarke et al. | 91/454 |
| 3,842,943 | 10/1974 | Nakamura et al. | 91/454 |
| 4,014,198 | 3/1977 | Herrmann | 60/413 |
| 4,085,587 | 4/1978 | Garlinghouse | 60/413 |
| 4,240,515 | 12/1980 | Kirkwood | 60/413 |
| 4,391,571 | 7/1983 | Cruggs | 91/436 |

FOREIGN PATENT DOCUMENTS

| | | | |
|---|---|---|---|
| 232867 | 4/1964 | Austria . | |
| 3239965 | 5/1984 | Fed. Rep. of Germany | 91/454 |
| 121378 | 9/1979 | Japan | 91/454 |

*Primary Examiner*—A. Michael Chambers
*Attorney, Agent, or Firm*—Harness, Dickey & Pierce

[57] ABSTRACT

The invention relates to a driving unit for a feed pump, particularly for a crude oil feed pump which is suitable for recovery of energy. The delivery flow of a hydraulic variable displacement pump, in particular a pump of the axial piston type is used to perform the upstroke of the pump piston. A directional valve control means is provided to deliver the liquid volume displaced under pressure in the downstroke of the pump piston through the pump in the same direction of flow as for the upstroke. The pressurized fluid may either pass to a reservoir, wherein the pump drives a motor for supplying electrical energy back to the electric supply, or, respectively, may load a hydraulic accumulator which is connected to the suction port of the pump for performing the upstroke of the pump piston for which the accumulator is discharged, wherein the remaining torque only has to be supplied by the drive motor. The feed pump drive unit according to the present invention is of simple design and has a high lifetime which is particularly true due to the fact that the variable displacement pump is adjusted from the neutral zero stroke position in the same direction each for performing the upstroke as well as the downstroke of the pump piston, thus avoiding any adjustment in the reverse direction of adjustment.

7 Claims, 1 Drawing Figure

DRIVING UNIT FOR A FEED PUMP

FIELD OF THE INVENTION

The present invention relates to a drive unit for a feed pump comprising a hydraulic cylinder including a piston separating said cylinder in a piston-sided chamber and a piston-rod-sided chamber, said piston alternatively performing an upstroke and a downstroke of the pump, a hydraulic motor driven variable displacement pump, said pump including a pressure port and a suction port which latter is connected through a check valve to a reservoir, a first line, a second line and a directional control valve means for connecting said pressure port of said pump via said first line to said piston-rod-sided chamber to perform an upstroke and for connecting said piston-rod-sided chamber to said second line in which a relatively low pressure prevails to perform a downstroke.

BACKGROUND OF THE INVENTION

Several types of drive units for crude oil feed pumps are known. For example, the pump rods of the so-called horsehead pump is driven by an electric motor through a gear mechanism including a counterweight. This drive results in equal speeds for the upstroke and downstroke. An energy recovery is not possible. To perform a slow downstroke and a faster upstroke, it is further known to use a cylinder pump as drive means, wherein the delivery flow of a hydraulic pump is supplied to the piston-rod-sided chamber of the cylinder. For performing the downstroke, the liquid volume displaced by the piston of the pump due to gravity is returned through an adjustable throttle to the reservoir. Again, an energy recovery is not possible. A drive means of this type is acknowledged in the preamble of claim 1.

A still further prior drive unit for a feed pump comprises a gas accumulator mounted atop of the pumping cylinder. In particular, the piston of the pumping cylinder is provided with a second piston rod and a second piston which limits the volume of the accumulator. When the piston of the pump is in the upper dead center, the gas pressure in the accumulator cylinder is such that the weight of the pump rods is at least counterbalanced. Both cylinder chambers of the pump are connected to an axial piston pump comprising a swash plate which can be swivelled over center. To lower the piston, the axial piston pump is swivelled in the one direction to supply liquid to the upper cylinder space of the pumping cylinder, whereby the piston is displaced downwardly, simultaneously compressing the gas pad in the accumulator. Accordingly, to lower the piston, energy must be supplied. At the lower dead center, the pressure in the accumulator has reached a maximum pressure and the axial piston pump is swivelled through the zero position into the second adjusting direction, whereby the flow direction is reversed and the lower cylinder space of the pumping cylinder is supplied with liquid to lift the pumping piston.

The upstroke motion is supported by the pressure in the gas accumulator such that the pressure difference between the accumulator pressure and the upstroke pressure must be balanced for by the pump. This arrangement thus makes possible an energy recovery.

SUMMARY OF THE INVENTION

It is an object of the present invention to provide an improved feed pump drive unit in particular for pumping crude oil, which has a desired recovery of energy, a simplified structure and an increased lifetime.

The improvements achieved by the present invention are obtained by connecting said second line to the suction port of the pump which pump is adjusted in the same direction of adjustment for the upstroke as well as for the downstroke and the flow through the pump is in the same direction.

The present invention has several advantages. According to the present invention, the gas accumulator is not driven by the piston of the pumping cylinder and thus must be not put atop of the pumping cylinder. Rather, the energy recovery may be achieved by means of any gas accumulator which is mounted at any suitable place of the unit. Supplying pressurized fluid to the pumping cylinder takes place only for lifting the piston, whereas lowering takes place by the weight of the pumping rods alone. Accordingly, any uncontrollable deformations of the pumping rods, in particular the pulling cable due to forced control of the piston (supplying pressurized fluid to the piston-sided cylinder chamber) is avoided when the pumping head encounters a resistance in the downstroke. Furthermore, the piston stops when the pumping rods gets stuck or when the pulling cable breaks. A defective pump may be easily recognized by visualizing the piston standing still which is particularly easy to realize by air reconnaissance.

A substantial advantage is the feature that the liquid flows through the pump in the same direction in the upstroke as well as the downstroke which feature avoids the necessity to adjust the variable displacement pump through the zero position into the reverse direction of adjustment. Accordingly, the lifetime of the axial piston pump is substantially increased in contrast to the pumps hitherto used which must be swivelled two times over center for any upstroke and downstroke of the pumping piston.

Additional advantages and benefits of the present invention will become apparent upon reading of the description of the preferred embodiments taken in conjunction with the accompanying drawing.

BRIEF DESCRIPTION OF THE DRAWING

The FIGURE is a schematic illustration of a feed pump drive unit including a hydraulic accumulator.

DETAILED DESCRIPTION

Figure 1:
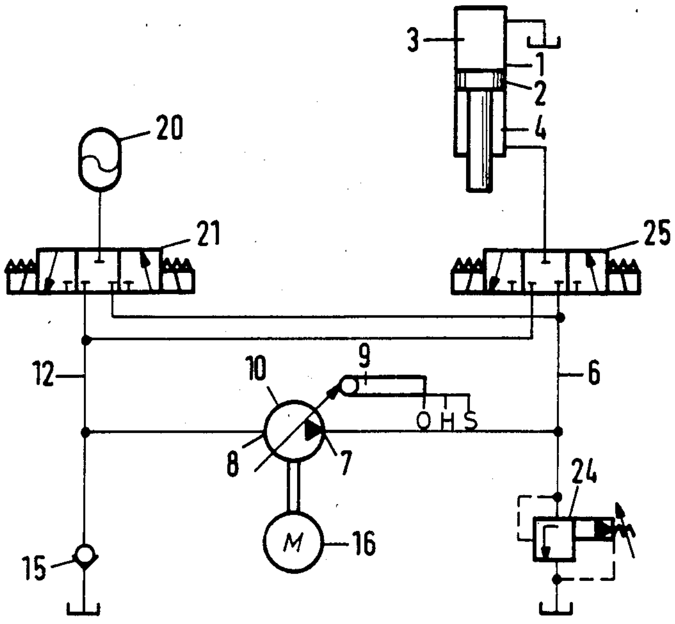

According to the embodiment shown, a hydraulic cylinder 1 houses a piston 2 which is connected to a pump rods not shown. Preferably, the pump is a crude oil feed pump. The piston-sided cylinder chamber 3 is connected to a reservoir.

The piston-rod-sided cylinder chamber 4 is connected in a manner to the described to a first line 6 which is connected to the pressure port 7 of a hydraulic pump 10. Further, the piston-rod-sided cylinder chamber 4 is connected in a manner to be described to a second line 12 which is connected to the suction port 8 of the pump 10.

The hydraulic pump includes an adjusting member 9 for adjusting the liquid volume displaced by the pump. The adjusting member 9 has a neutral position 0 in which the pump performs a zero stroke from which neutral position the member may be adjusted in the same adjusting direction to the position H for the upstroke and to the position S for a downstroke of the piston 2. For example, the variable displacement pump 10 can be an axial piston pump with adjustable swash plate which is swivelled from its neutral position corresponding to the zero stroke of the pump in the same angular range each for lifting and lowering the piston, thus avoiding a swivelling past the neutral position into the opposite angular range of the swash plate.

Furthermore, the first line 6 and thus the pressure port 7 of the pump 10 is connected in a manner to be described to the reservoir. The suction port 8 of the pump connected to the second line 12 is connected via a check valve 15 to the reservoir. The pump 10 is driven by an electric motor 16.

In the embodiment shown a hydraulic accumulator 20 is provided for recovery of energy.

The connections between the cylinder 1, the variable displacement pump 10 and the accumulator 20 are controlled by a pair of 3/3 directional control valves 21 and 25. A pressure relief valve 24 is provided between the second line 6 and the reservoir. This valve opens when the pressure in the line 6 exceeds a predetermined maximum pressure.

For charging the accumulator 20 with liquid from the reservoir, the directional control valve 21 is brought into the position in which the second line 6 is connected to the accumulator 20. The valve 25 remains in the neutral position shown. Accordingly, the pump 10 draws liquid from the reservoir through the check valve 15 and delivers the liquid through the line 6 into the accumulator. The energy recovery becomes an optimum when the accumulator pressure is selected such that the force supplied balances the weight of the pump rod plus 50% of the force necessary for the feed stroke. For example, the accumulator 20 is charged to a pressure of 50 bar plus $\frac{1}{2}$ times 110 bar=105 bar, when a pressure of 50 bar is necessary to counterbalance the weight of the pump and when the pressure for the upstroke is 110 bar. In properly selecting the accumulator 20 it is desired that the pressure of the accumulator should undergo small changes only when the piston 2 is lifted in the discharge mode of the accumulator. This results in a nearly constant energy supply to the motor 16.

To perform the upstroke of the piston 2, the first line 6 is connected through the valve 25 to the piston-rod-sided chamber 4 and the accumulator 20 is connected through the second line 12 to the suction port of the pump 10. Accordingly, the pressure of the accumulator acts on the pump 10 to produce a corresponding torque. The residual torque necessary for the upstroke is generated by the motor 16.

To perform the downstroke, the valve 25 is positioned to connect the piston-rod-sided chamber 4 to the second line 12 and thus to the suction port 8 of the pump 10. The valve 21 is positioned to connect the first line 6 to the accumulator 20. The liquid being displaced from the cylinder by the weight of the pump rods flows through the pump 10 in the same direction of flow and charges the accumulator 20 through the first line 6. The residual torque necessary to charge the accumulator to the pressure above referred to is delivered by the motor 16 driving the pump 10.

According to the embodiment of FIG. 2, the adjusting element 9 of the pump is again swivelled towards one side only for lifting and lowering but is not swivelled through the zero position. Accordingly, the lifetime of pumps of this type is substantially increased. Since the piston 2 is moved by the weight of the pumping rods in the downstroke mode, the piston 2 stands still when the pumping rods or the pulling cable supporting the pumping elements get stuck. If this occurs, the pump draws liquid from the reservoir through the check valve and charges the accumulator to a maximum pressure. Thereafter, the pressure relief valve is opened to bypass position by a signal or, respectively, the pump is stopped. A defective pump is thus easily recognized by visual inspection. Furthermore, the drive unit may be adjusted such that the piston 2 stops when no pulling forces are exerted on the pumping rods.

Rather that utilizing a hydraulic accumulator, the electric motor 16 may be driven during the downstroke of the piston 2 so as to generate electrical energy.

In the embodiment shown, the positioning of the directional control valves is obtain by a control unit not shown. The positioning of the valves is initiated by signals generated at the dead center locations of the piston in a known manner.

What is claimed is:

1. A driving unit for a feed pump, comprising a hydraulic cylinder including a piston separating said cylinder into a piston-sided chamber and a piston-rod-sided chamber, said piston alternatively performing an upstroke and a downstroke of the pump, a driven variable displacement pump, said pump including a pressure port and a suction port, said suction port being connected through a check valve to a reservoir, a first line, and a second line the improvement comprising directional control valve means for connecting said pressure port of said pump via said first line to said piston-rod-sided chamber to perform an upstroke and for connecting said piston-rod-sided chamber to said second line in which a relatively low pressure prevails to perform a downstroke including means connecting said second line to the suction port of said pump upon downstroke operation for flow through said pump from said suction port to said pressure port upon said downstroke operation to drive said pump to recover energy, said pump being adjusted in the same direction of adjustment for the upstroke as well as for the downstroke for flow therethrough in the same direction during both upstroke and downstroke operation.

2. The driving unit of claim 1, comprising a hydraulic accumulator and a directional control valve for connecting the accumulator to the second line for the piston-up stroke and to the first line for the piston-down stroke.

3. The driving unit of claim 2, wherein said first line is connected to the reservoir through a piloted pressure relief valve.

4. The driving unit of claim 2, wherein a directional control valve is provided for connecting said cylinder and said accumulator to said pump.

5. The drive unit of claim 1, wherein the first line is connected to the reservoir for performing the downstroke of the piston.

6. The drive unit of claim 5, wherein said first line is connected to said reservoir through a piloted pressure relief valve.

7. The drive unit of claim 6, wherein a directional control valve is provided in both said first line between the pressure port of the pump and the cylinder chamber and the reservoir and wherein a further directional control valve is provided in said second line between the suction port of the pump and the cylinder chamber.

* * * * *